T. B. ENLOE.
STREET CAR AND AUTOMOBILE FENDER.
APPLICATION FILED MAR. 20, 1915.
1,177,403.
Patented Mar. 28, 1916.
2 SHEETS—SHEET 1.
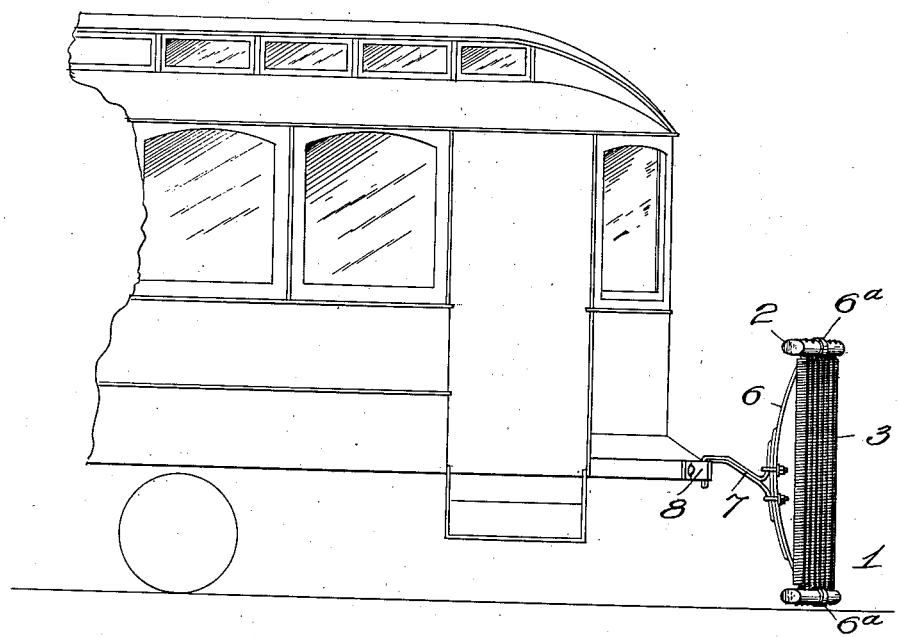
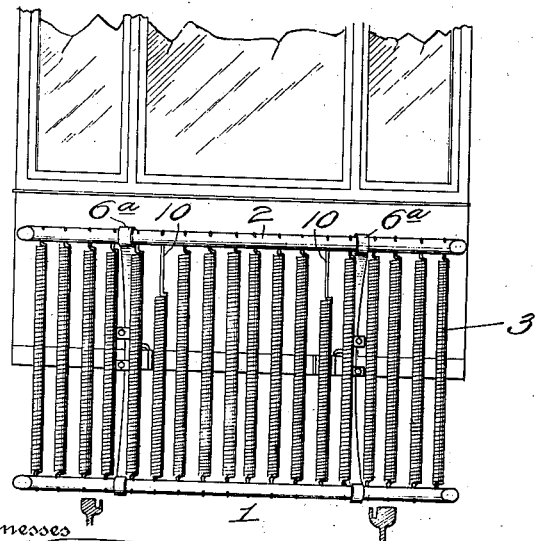
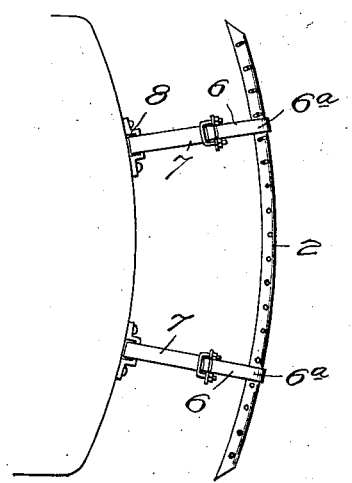
Witnesses
Inventor
T. B. Enloe,
By John S. Duffie
Attorney T. B. ENLOE.
STREET CAR AND AUTOMOBILE FENDER.
APPLICATION FILED MAR. 20, 1915.
1,177,403.
Patented Mar. 28, 1916.
2 SHEETS—SHEET 2.
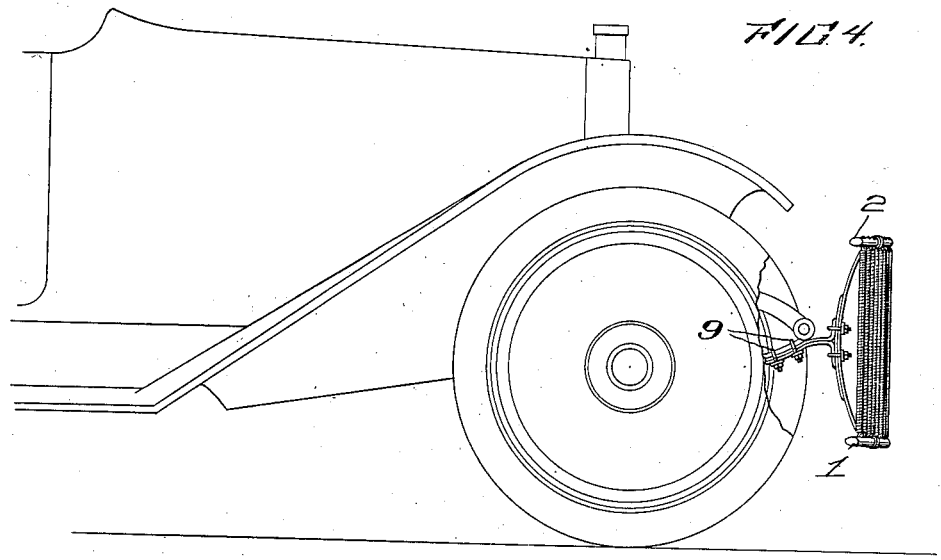
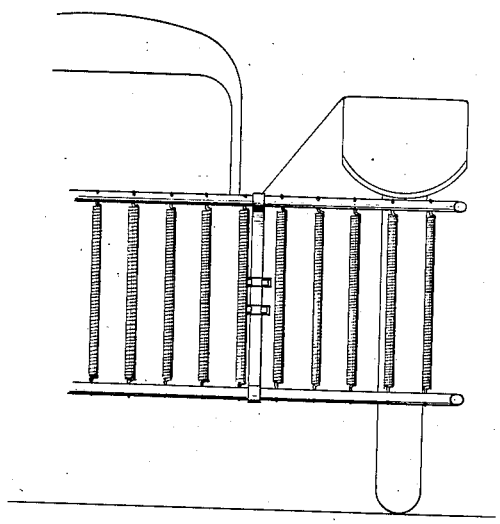
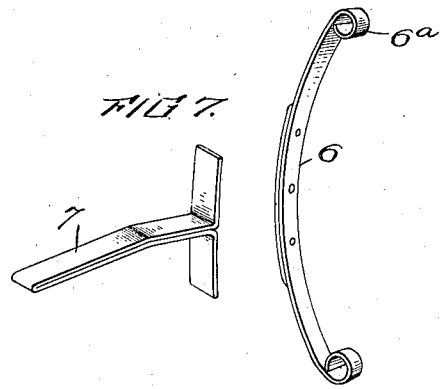
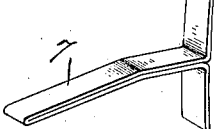
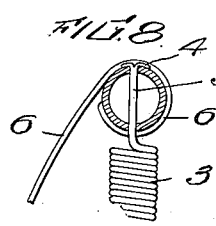
Inventor
T. B. EnLoe,
Witnesses
By
Attorney

UNITED STATES PATENT OFFICE.

THOMAS B. ENLOE, OF HOT SPRINGS, ARKANSAS.

STREET-CAR AND AUTOMOBILE FENDER.

1,177,403.  Specification of Letters Patent.  Patented Mar. 28, 1916.

Application filed March 20, 1915.  Serial No. 15,804.

*To all whom it may concern:*

Be it known that I, THOMAS B. ENLOE, a citizen of the United States, residing at Hot Springs, in the county of Garland and State of Arkansas, have invented certain new and useful Improvements in Street-Car and Automobile Fenders, of which the following is a specification.

This invention relates to improvements in fenders for street cars and automobiles.

The invention has for its object to provide for the perfect safeguarding of persons or animals, who may be struck by the fender, as against being thrown under the car or automobile wheels; also to lessen the force or resistance of the contact between the body and the fender.

A further object is to provide for neutralizing the noise which would otherwise result from the tension of the springs constituting the fender and the motion of the vehicle.

A still further object is to carry out the aforesaid ends in a simple, inexpensive and effective manner.

The invention consists therefore in certain instrumentalities and features of construction substantially as hereinafter fully disclosed and defined by the appended claim.

In the accompanying drawing, illustrating the preferred form of carrying out my invention, Figure 1 is a fragmental side view of a street-car, with my invention applied thereto. Fig. 2 is a front view of the same. Fig. 3 is a plan view thereof. Fig. 4 is a fragmental side view of an automobile with my invention applied thereto, parts being broken away. Fig. 5 is a fragmental front view of the same. Figs. 6, 7 and 8 are sundry detail views thereof, self-explanatory.

In putting my invention or fender into practice, as in applying it to a street-car or automobile, I constitute the same principally of duplicate arcuate members 1, 2 which act as double buffers, and of a plurality of resilient members or springs or cushions 3, preferably compactly coiled, said springs having their ends connected to said arcuate members or buffers at quite short intervals, to form a guard or fender as indicated, for positioning at the forward end of the car or automobile for safeguarding against the person or animal caught upon the fender being thrown or caught under the car or automobile wheel. This is apparent from the fact that the fender, presenting a rounded or convex surface forwardly, which results from the aforesaid described structure and arrangement of parts, will have the effect, as the object comes in contact therewith, to deflect or direct it laterally or to one side thereof, accordingly out of the line of travel of the vehicle.

The preferable way of effecting the attachment of the ends of the springs or resilient members 3 to the members 1 and 2 is by suitably splitting said ends or terminals of said springs, thus providing for the bending the resultant branches 4 oppositely upon said members 1 and 2, the spring-forming wires being left uncoiled or straight as at 5 allowing of the passing of said straight portions through coincident openings in the arcuate members 1, 2, as seen particularly in Fig. 8. In providing for supporting the duplicate members 1, 2, preferably made of nickel-plated iron, in position and applying the fender to the car, in this instance, I provide semi-elliptic resilient members 6, which also have the effect to brace the fender and aid its resistance-action, each resilient member having its ends clipped around the members 1, 2 and having suitably stapled thereto, about centrally, an arm 7 suitably bent as shown, with its inner or free end at right-angles to the other portion of the arm to enable it to enter a keeper 8 suitably secured to the forward end of the car-frame, as seen particularly in Figs. 1 and 3, this arrangement providing for the ready and detachable connection of the fender to the car and its removal therefrom, as may be desired.

In Fig. 4 my device or fender is shown as applied to an automobile, the arms 7 of the semi-elliptic members 6 being devoid of the inner end right-angled terminals and adapted to be clipped to the front-axle springs, as at 9, the fender, in this instance, however, being arranged to stand somewhat more elevated from the surface or ground. It is observed that the coils located in front of the lamps may be omitted, as at 10, in the use of the fender in automobiles, to avoid obstructing the light from the lamp-reflectors.

I claim—

A car and automobile fender, including upper and lower arcuate members, said members being bowed horizontally and forwardly with respect to the vehicle to which they may be connected, a plurality of tubular compactly-coiled resilient members connected at their ends to said upper and lower members, the forming wires of said tubular resilient members extending vertically through the latter and clamped thereon, said tubular coiled members being spaced quite close intervals apart, and semi-elliptic resilient members whose terminals are adapted to clasp said upper and lower members, said semi-elliptic resilient members having their convexities presented toward the vehicle and attaching means for said semi-elliptic resilient members, extending about centrally therefrom.

In testimony whereof I affix my signature in presence of two witnesses.

THOMAS B. ENLOE.

Witnesses:
J. P. RANDOLPH,
C. A. McCONNELL.